(12) United States Patent
Yang et al.

(10) Patent No.: US 11,460,692 B2
(45) Date of Patent: Oct. 4, 2022

(54) SPACER AND CAMERA MODULE

(71) Applicant: Samsung Electro-Mechanics Co., Ltd., Suwon-si (KR)

(72) Inventors: Dong Shin Yang, Suwon-si (KR); In Gun Kim, Suwon-si (KR); Sot Eum Seo, Suwon-si (KR); Ju Sung Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/774,132

(22) Filed: Jan. 28, 2020

(65) Prior Publication Data

US 2021/0132373 A1 May 6, 2021

(30) Foreign Application Priority Data

Nov. 1, 2019 (KR) .................. 10-2019-0138576

(51) Int. Cl.
*G02B 7/02* (2021.01)
*G02B 27/00* (2006.01)

(52) U.S. Cl.
CPC ......... *G02B 27/0018* (2013.01); *G02B 7/021* (2013.01)

(58) Field of Classification Search
CPC .. G02B 27/0018; G02B 7/021; G02B 3/0087; G02B 27/00; G02B 7/02; G03B 17/12; H04N 5/2257
See application file for complete search history.

(56) References Cited

U.S. PATENT DOCUMENTS

| 9,392,188 B2 | 7/2016 | Shabtay et al. | |
|---|---|---|---|
| 10,996,421 B2 | 5/2021 | Yang et al. | |
| 2011/0032409 A1* | 2/2011 | Rossi | B29D 11/00307 348/340 |
| 2013/0279032 A1* | 10/2013 | Suigetsu | G02B 7/022 359/827 |
| 2013/0287383 A1 | 10/2013 | Haruguchi et al. | |

(Continued)

FOREIGN PATENT DOCUMENTS

| CN | 103885155 A | 6/2014 |
|---|---|---|
| CN | 109981942 A | 7/2019 |

(Continued)

OTHER PUBLICATIONS

Korean Office Action dated Apr. 6, 2021 in Counterpart Korean Patent Application No. 10-2019-0138576 (Eight pages in English and Six pages in Korean).

(Continued)

*Primary Examiner* — Balram T Parbadia
(74) *Attorney, Agent, or Firm* — NSIP Law

(57) ABSTRACT

A spacer includes an outer circumferential surface in contact with a lens barrel, and an inner circumferential surface forming a hole for controlling an amount of light, a first length of the hole in a first direction, intersecting an optical axis, and a second length of the hole in a second direction, intersecting the optical axis, are different from each other, and a first distance from the outer circumferential surface to the inner circumferential surface, extended in the first direction, is less than a second distance from the outer circumferential surface to the inner circumferential surface, extended in the second direction.

17 Claims, 8 Drawing Sheets

(56) References Cited

U.S. PATENT DOCUMENTS

| | | | |
|---|---|---|---|
| 2014/0160581 A1* | 6/2014 | Cho | G02B 13/0035 |
| | | | 359/738 |
| 2014/0177079 A1 | 6/2014 | Kim | |
| 2014/0368723 A1* | 12/2014 | Jung | H01L 27/14623 |
| | | | 348/340 |
| 2015/0022896 A1* | 1/2015 | Cho | G02B 7/026 |
| | | | 359/601 |
| 2015/0198779 A1 | 7/2015 | Cho et al. | |
| 2015/0323757 A1* | 11/2015 | Bone | B29D 11/00432 |
| | | | 359/819 |
| 2016/0349504 A1* | 12/2016 | Kim | G02B 13/0045 |
| 2017/0160511 A1* | 6/2017 | Kim | G02B 13/002 |
| 2019/0179098 A1 | 6/2019 | Yang et al. | |
| 2020/0409020 A1* | 12/2020 | Yedid | G02B 27/0018 |

FOREIGN PATENT DOCUMENTS

| | | |
|---|---|---|
| JP | 2013-228610 A | 11/2013 |
| KR | 10-2019-0070230 A | 6/2019 |
| WO | WO 2019/167001 A1 | 9/2019 |

OTHER PUBLICATIONS

Notice of Decision of Rejection dated Oct. 26, 2021 in counterpart Korean Patent Application No. 10-2019-0138576 (6 pages in English and 4 pages in Korean).

Chinese Office Action dated Apr. 24, 2022, in counterpart Chinese Patent Application No. 202010333405.2 (6 pages in English and 7 pages in Chinese).

* cited by examiner

SPACER AND CAMERA MODULE

CROSS-REFERENCE TO RELATED APPLICATIONS

This application claims the benefit under 35 U.S.C. 119(a) of Korean Patent Application No. 10-2019-0138576 filed on Nov. 1, 2019, in the Korean Intellectual Property Office, the entire disclosure of which is incorporated herein by reference for all purposes.

BACKGROUND

1. Field

The present disclosure relates to a spacer disposed between lenses and a camera module including a spacer disposed between lenses.

2. Description of the Background

Camera modules are used in portable electronic devices such as smartphones. Since portable electronic devices such as smartphones are equipped with a number of devices for achieving their functions, the space for mounting the camera module may be narrow. Therefore, downsizing and thinning of the camera module may be desired to mount the camera module in a portable electronic device.

On the other hand, the resolution of the camera module may be affected by a flare phenomenon. In particular, a flare phenomenon occurring between a lens and another lens may hinder the resolution of the camera module. Therefore, there is a need for the development of a technology capable of reducing the flare phenomenon occurring between a lens and another lens.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a spacer includes an outer circumferential surface configured to be in contact with a lens barrel, and an inner circumferential surface forming a hole for controlling an amount of light, a first length of the hole in a first direction, intersecting an optical axis, and a second length of the hole in a second direction, intersecting the optical axis, are different from each other, and a first distance from the outer circumferential surface to the inner circumferential surface, extended in the first direction, is less than a second distance from the outer circumferential surface to the inner circumferential surface, extended in the second direction.

The outer circumferential surface may include a first side surface portion extended in parallel with the second direction, a second side surface portion extended in parallel with the first side surface portion, a third side surface portion connecting one end of the first side surface portion to one end of the second side surface portion and having a curved shape, and a fourth side surface portion connecting the other end of the first side surface portion to the other end of the second side surface portion and having a curved shape.

A distance from the first side surface portion to the second side surface portion may be equal to or less than 6 mm.

The third side surface portion may have a linear section extended in parallel with the first direction.

The inner circumferential surface may include a first side surface portion extended in parallel with the second direction, a second side surface portion extended in parallel with the first side surface portion, a third side surface portion connecting one end of the first side surface portion to one end of the second side surface portion and having a curved shape, and a fourth side surface portion connecting the other end of the first side surface portion to the other end of the second side surface portion and having a curved shape.

The third side surface portion and the fourth side surface portion may each include a first inclination angle with respect to the optical axis, and the first side surface portion and the second side surface portion may each include a second inclination angle with respect to the optical axis.

The third side surface portion and the fourth side surface portion may each include a first inclination angle and a second inclination angle with respect to the optical axis, and the first side surface portion and the second side surface portion may each include a third inclination angle and a fourth inclination angle with respect to the optical axis.

A thickness of the spacer in an optical axis direction may be equal to or greater than 0.15 mm.

The inner circumferential surface may include an inclination angle with respect to the optical axis.

A minimum area of the hole may be equal to or greater than 70% of a maximum area of the hole.

In another general aspect, a camera module includes a lens barrel accommodating a first lens and a second lens, disposed in an optical axis direction, and a spacer disposed between the first lens and the second lens, wherein a portion of the spacer is disposed at an interval from one or more of the first lens and the second lens in the optical axis direction.

The spacer may include an outer circumferential surface in contact with the lens barrel, and an inner circumferential surface forming a hole through which the optical axis passes, wherein the hole includes a first length in a first direction, intersecting the optical axis, and a second length in a second direction, intersecting the optical axis, and wherein a first distance from the outer circumferential surface to the inner circumferential surface, extended in the first direction, is less than a second distance from the outer circumferential surface to the inner circumferential surface, extended in the second direction.

The third side surface portion and the fourth side surface portion may be disposed in contact with the lens barrel.

One or more of the first lens and the second lens may include a refracting portion configured to refract light incident along the optical axis, and a shading portion disposed at an interval along a perimeter of the refracting portion.

The shading portion may be in contact with the third side surface portion and the fourth side surface portion.

The refracting portion may include a linear portion extended in the second direction.

The linear portion may be disposed at intervals from the first side surface portion and the second side surface portion.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
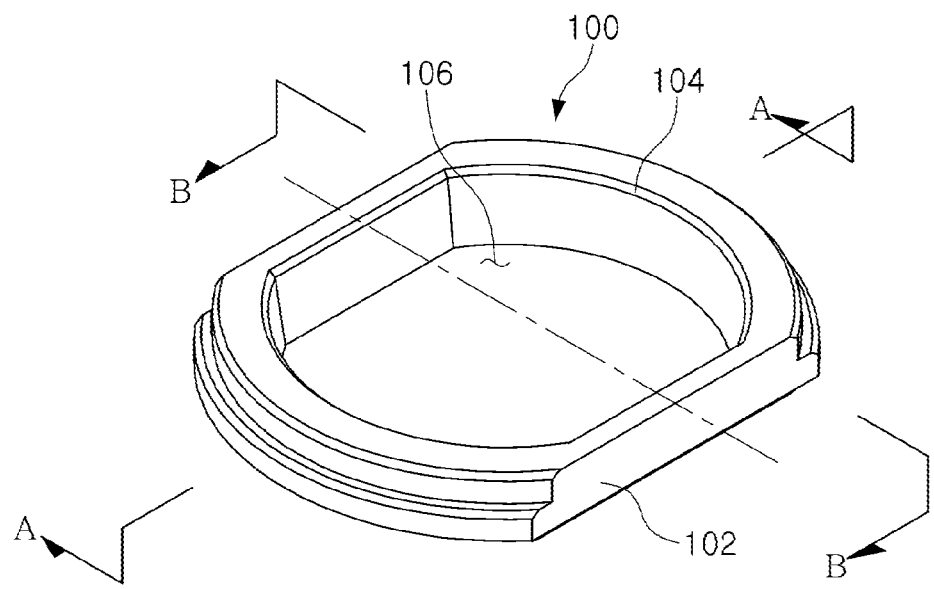
FIG. 1 is a perspective view of one or more examples of a spacer according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

In the drawings, the thicknesses, sizes, and shapes of lenses may be somewhat exaggerated for convenience of explanation. In particular, the shapes of spherical surfaces or aspherical surfaces illustrated in the drawings are only illustrative. That is, the shapes of the spherical surfaces or the aspherical surfaces are not limited to those illustrated in the drawings.

In addition, a first surface of each lens refers to a surface thereof closest to an object side (or an object-side surface) and a second surface of each lens refers to a surface thereof closest to an image side (or an image-side surface). Further, in the present specification, all numerical values of radii of curvature, thicknesses, distances, focal lengths, and the like, of lenses are indicated by millimeters (mm), and a field of view (FOV) is indicated by degrees.

Further, in a description of a shape of each of the lenses, the meaning that one surface of a lens is convex is that a paraxial region portion of a corresponding surface is convex, the meaning that one surface of a lens is concave is that a paraxial region portion of a corresponding surface is concave, and the meaning that one surface of a lens is a plane is that a paraxial region portion of a corresponding surface is a plane. Therefore, although it is described that one surface of a lens is convex, an edge portion of the lens may be concave. Likewise, although it is described that one surface of a lens is concave, an edge portion of the lens may be convex. Moreover, although it is described that one surface of a lens is a plane, an edge portion of the lens may be convex or concave.

Meanwhile, a paraxial region refers to a narrow region including an optical axis.

One or more examples of the present disclosure may provide a spacer capable of reducing a flare phenomenon and a camera module to be easily mounted in a portable terminal.

Referring to FIG. 1, one or more examples of a spacer according to an embodiment will be described.

A spacer 100 according to an embodiment may be disposed in a lens barrel. The spacer 100 may be configured to be in contact with the lens barrel so that a position thereof can be aligned. For example, an outer circumferential surface 102 of the spacer 100 may be in contact with the lens barrel. The outer circumferential surface 102 may be partially in contact with the lens barrel. For example, a portion of the outer circumferential surface 102 is in contact with the lens barrel, but the remaining portion of the outer circumferential surface 102 may not be in contact with the lens barrel.

The spacer 100 may have a shape in which a length in a first direction, intersecting an optical axis, is different from a length in a second direction. For example, a transverse section of the spacer 100 may be substantially elliptic or oblong. However, a shape of the transverse section of the spacer 100 is not limited to an ellipse or an oblong.

The spacer 100 may be configured to control an amount of incident light. For example, the inner circumferential surface 104 of the spacer 100 may form a hole 106 for controlling an amount of light. The hole 106 may have a shape substantially similar to a transverse section of the spacer 100. For example, the transverse section of the hole 106 may be substantially elliptic or oblong.

Figure 2:
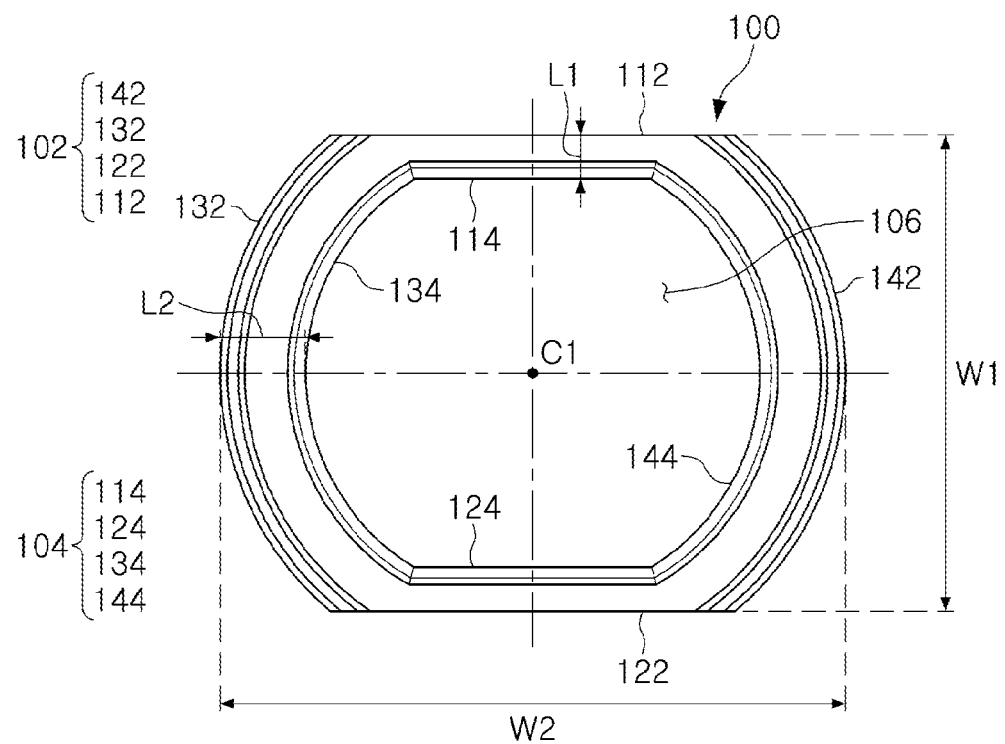
FIG. 2 is a plan view of the spacer illustrated in FIG. 1.

Referring to FIG. 2, one or more examples of a planar shape of a spacer will be described in detail.

The spacer 100 has a first length W1 in a first direction, intersecting an optical axis C1, and has a second length W2 in a second direction, intersecting the optical axis C1. In an embodiment, the first length W1 and the second length W2 may be formed to be different from each other. For example, the first length W1 may be less than the second length W2.

In the spacer 100, a distance from an outer circumferential surface to an inner circumferential surface may vary depending on a location. For example, a first distance L1 from an outer circumferential surface to an inner circumferential surface, extended in a first direction, may be less than a second distance L2 from an outer circumferential surface to an inner circumferential surface, extended in a second direction.

The spacer 100, configured as described above, may enable the reduction of the lens barrel.

The outer circumferential surface 102 of the spacer 100 includes a plurality of side surface portions. For example, the outer circumferential surface 102 includes a first side surface portion 112, a second side surface portion 122, a third side surface portion 132, and a fourth side surface portion 142.

The first side surface portion 112 and the second side surface portion 122, of the outer circumferential surface 102, may have a linear shape extended in parallel with the second direction. The third side surface portion 132 of the outer circumferential surface 102 may be formed to have a curved shape connecting one end of the first side surface portion 112 to one end of the second side surface portion 122. The fourth side surface portion 142 of the outer circumferential surface 102 may be formed to have a curved shape connecting the other end of the first side surface portion 112 to the other end of the second side surface portion 122.

The spacer 100 may have a predetermined size. For example, a distance (or a first length W1) from the first side surface portion 112 of the outer circumferential surface 102 to the second side surface portion 122 of the outer circumferential surface 102 may be equal to or less than 6 mm.

The inner circumferential surface 104 of the spacer 100 includes a plurality of side surface portions. For example, the inner circumferential surface 104 includes a first side surface portion 114, a second side surface portion 124, a third side surface portion 134, and a fourth side surface portion 144.

The first side surface portion 114 and the second side surface portion 124, of the inner circumferential surface 104, may have a linear shape extended in parallel with the second direction. The third side surface portion 134 of the inner circumferential surface 104 may be formed to have a curved shape connecting one end of the first side surface portion 114 to one end of the second side surface portion 124. The fourth side surface portion 144 of the inner circumferential surface 104 may be formed to have a curved shape connecting the other end of the first side surface portion 114 to the other end of the second side surface portion 124.

The first side surface portion 112 and the second side surface portion 122, of the outer circumferential surface 102, may be formed closest to the first side surface portion 114 and the second side surface portion 124, of the inner circumferential surface 104. For example, the distance L1 from the first side surface portion 112 of the outer circumferential surface 102 to the first side surface portion 114 of the inner circumferential surface 104 may be formed to have a minimum size within a range in which injection molding could be performed.

On the other hand, the third side surface portion 132 and the fourth side surface portion 142, of the outer circumferential surface 102, may be formed at a considerable distance from the third side surface portion 134 and the fourth side surface portion 144, of the inner circumferential surface 104. For example, a distance L2 from the third side surface portion 132 to the third side surface portion 134 may be formed to have a considerable size to block unnecessary transmission of light.

Figure 3:
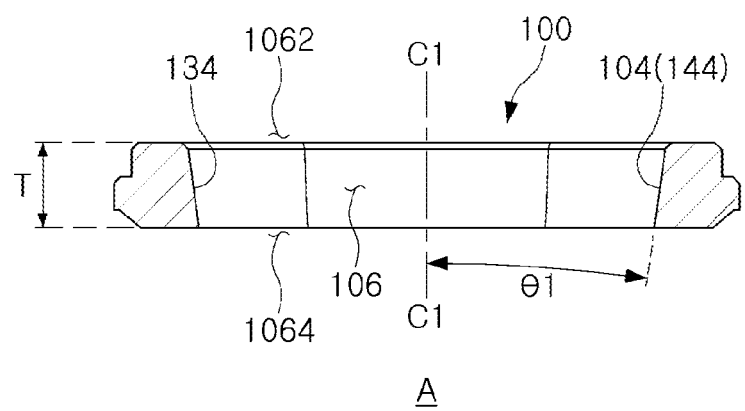
FIG. 3 is a plan view taken along line A-A of the spacer illustrated in FIG. 1.
Figure 4:
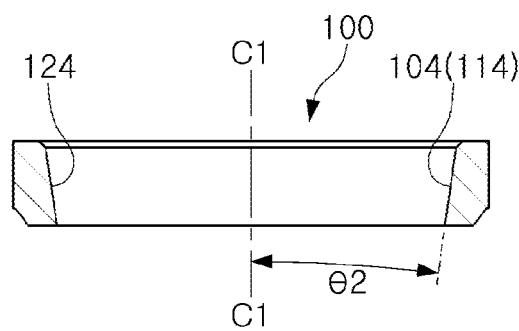
FIG. 4 is a cross-sectional view taken along line B-B of the spacer illustrated in FIG. 1.

Referring to FIGS. 3 and 4, one or more examples of a cross-sectional shape of a spacer will be described.

The spacer 100 may be configured to reduce a flare phenomenon. For example, the inner circumferential surface 104 of the spacer 100 may be formed to have predetermined inclination angles θ1 and θ2 with respect to an optical axis C1. In the inner circumferential surface 104, the third side surface portion 134 and the fourth side surface portion 144 have a first inclination angle θ1 with respect to the optical axis C1, while the first side surface portion 114 and the second side surface portion 124 have a second inclination angle θ2 with respect to the optical axis C1. The first inclination angle θ1 and the second inclination angle θ2 may have different sizes.

The spacer 100 may be configured so that injection molding or cutting molding is easily performed. For example, a minimum area of the hole 106 (an area of a lower hole 1064 based on FIG. 3) may be equal to or more than 70% of a maximum area of the hole 106 (an area of an upper hole 1062 based on FIG. 3).

The spacer 100 may be configured so that bending deformation is prevented and injection molding is easily performed. For example, a thickness T of the spacer 100 may be equal to or more than 0.15 mm.

Next, one or more examples of a spacer according to another embodiment will be described. For reference, in the following description, the same components as those of the above-described embodiment use the same reference numerals as the above-described embodiment, and further detailed descriptions of these components are omitted.

Figure 5:
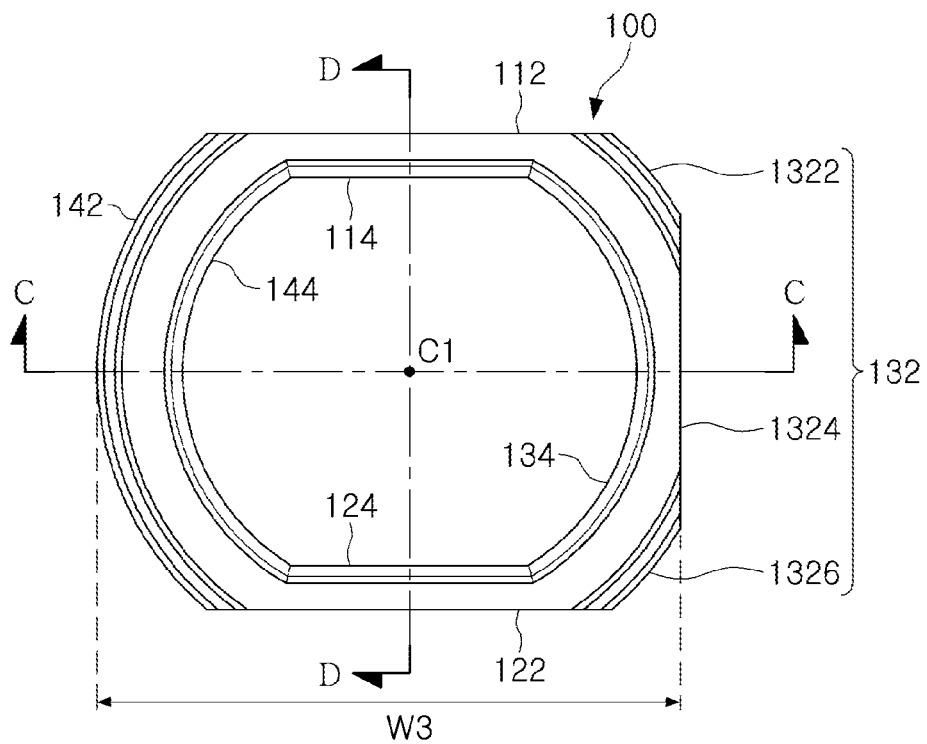
FIG. 5 is a perspective view of one or more examples of a spacer according to another embodiment.
Figure 6:
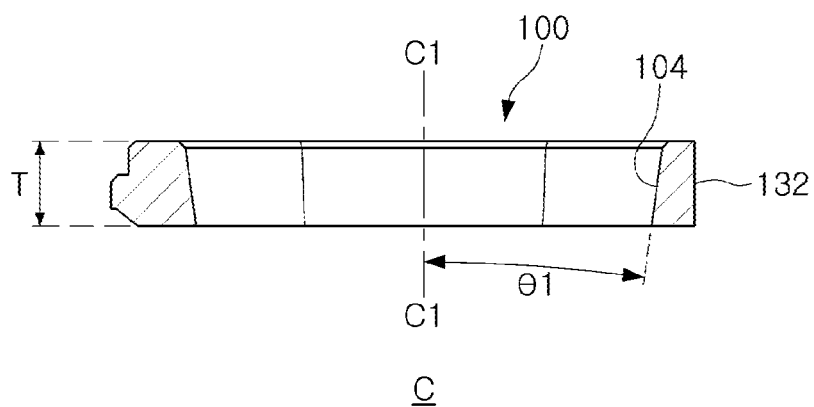
FIG. 6 is a cross-sectional view taken along line C-C of the spacer illustrated in FIG. 5.
Figure 7:
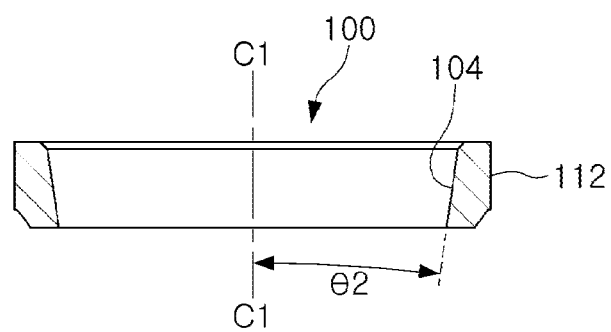
FIG. 7 is a cross-sectional view taken along line D-D of the spacer illustrated in FIG. 5.

Referring to FIGS. 5 to 7, one or more examples of a spacer according to the present embodiment will be described.

A spacer 100 includes an outer circumferential surface 102 and an inner circumferential surface 104. The outer circumferential surface 102 may be partially in contact with a lens barrel, and the inner circumferential surface 104 may form a hole 106 through which incident light passes.

An outer circumferential surface 102 according to an embodiment includes a first side surface portion 112, a second side surface portion 122, a third side surface portion 132, and a fourth side surface portion 142. The first side surface portion 112 and the second side surface portion 122 have a linear shape, while the fourth side surface portion 142 has a curved shape. On the other hand, the third side surface portion 132 has a shape including a linear line and a curved line. For example, the third side surface portion 132 may have a shape in which a curved section 1322, a linear section 1324, and a curved section 1326 are sequentially connected.

The inner circumferential surface 104 includes a first side surface portion 114, a second side surface portion 124, a third side surface portion 134, and a fourth side surface portion 144. The first side surface portion 114 and the second side surface portion 124 have a linear shape, while the third side surface portion 134 and the fourth side surface portion 144 have a curved shape.

Since a third distance W3 from the third side surface portion 132 of the outer circumferential surface 102 to the fourth side surface portion 142 of the outer circumferential surface 102 is short, the spacer 100, configured as described above, may allow thinning or downsizing of a lens barrel or a camera module.

The inner circumferential surface 104 of the spacer 100 may be formed to have predetermined inclination angles θ1 and θ2 with respect to the optical axis C1 in a similar manner to the embodiment described above.

Figure 8:
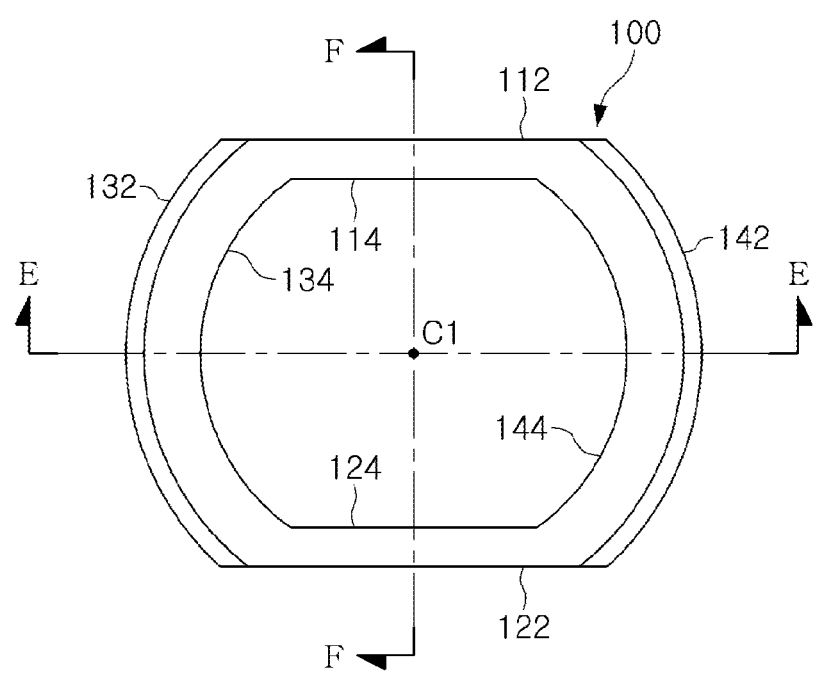
FIG. 8 is a perspective view of one or more examples of a spacer according to another embodiment.
Figure 9:
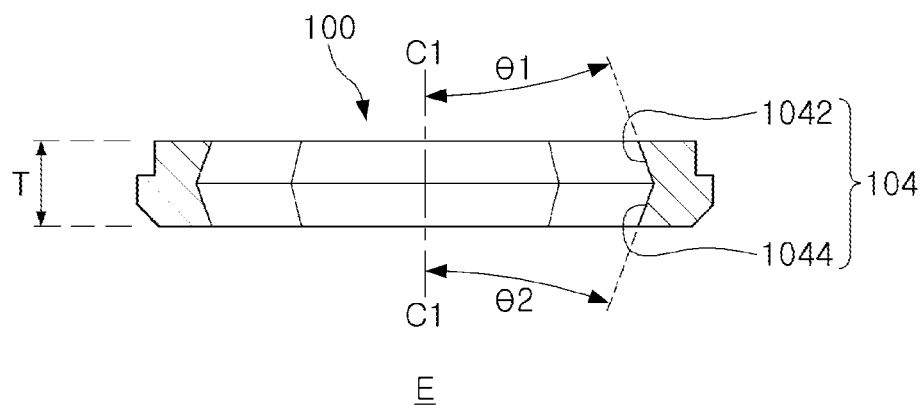
FIG. 9 is a cross-sectional view taken along line E-E of the spacer illustrated in FIG. 8.
Figure 10:
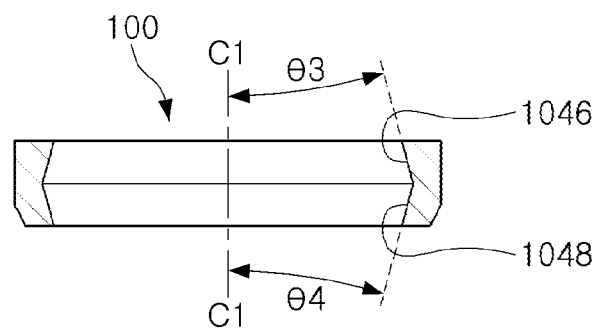
FIG. 10 is a cross-sectional view taken along line F-F of the spacer illustrated in FIG. 8.

Referring to FIGS. 8 to 10, one or more examples of a spacer according to another embodiment will be described.

A spacer 100 includes an outer circumferential surface 102 and an inner circumferential surface 104. The outer circumferential surface 102 may be partially in contact with a lens barrel, and the inner circumferential surface 104 may form a hole 106 through which incident light passes.

An outer circumferential surface 102 according to an embodiment includes a first side surface portion 112, a second side surface portion 122, a third side surface portion 132, and a fourth side surface portion 142. The first side surface portion 112 and the second side surface portion 122 have a linear shape, while the third side surface portion 132 and the fourth side surface portion 142 have a curved shape.

The inner circumferential surface 104 includes a first side surface portion 114, a second side surface portion 124, a third side surface portion 134, and a fourth side surface portion 144. The first side surface portion 114 and the second side surface portion 124 have a linear shape, while the third side surface portion 134 and the fourth side surface portion 144 have a curved shape.

The inner circumferential surface 104 according to an embodiment includes a plurality of inclination portions having different slopes with respect to an optical axis. For example, a first inclination portion 1042 of the inner circumferential surface 104 has a first inclination angle θ1 with respect to the optical axis C1, a second inclination portion 1044 has a second inclination angle θ2 with respect to the optical axis C1, a third inclination portion 1046 has a third inclination angle θ3 with respect to the optical axis C1, and the fourth inclination portion 1048 has a fourth inclination angle θ4 with respect to the optical axis C1.

The inclination angle of the inner circumferential surface 104 may vary depending on a location. For example, the first inclination angle θ1 of the first inclination portion 1042 and the second inclination angle θ2 of the second inclination portion 1044, formed in the first side surface portion 114 and the second side surface portion 124, may be less than 20 degrees. Alternatively, the third inclination angle θ3 of the third inclination portion 1046 and the fourth inclination angle θ4 of the fourth inclination portion 1048, formed in the third side surface portion 134 and the fourth side surface portion 144, may be equal to or greater than 20 degrees.

The spacer 100, configured as described above, may reduce a flare phenomenon.

Figure 11:
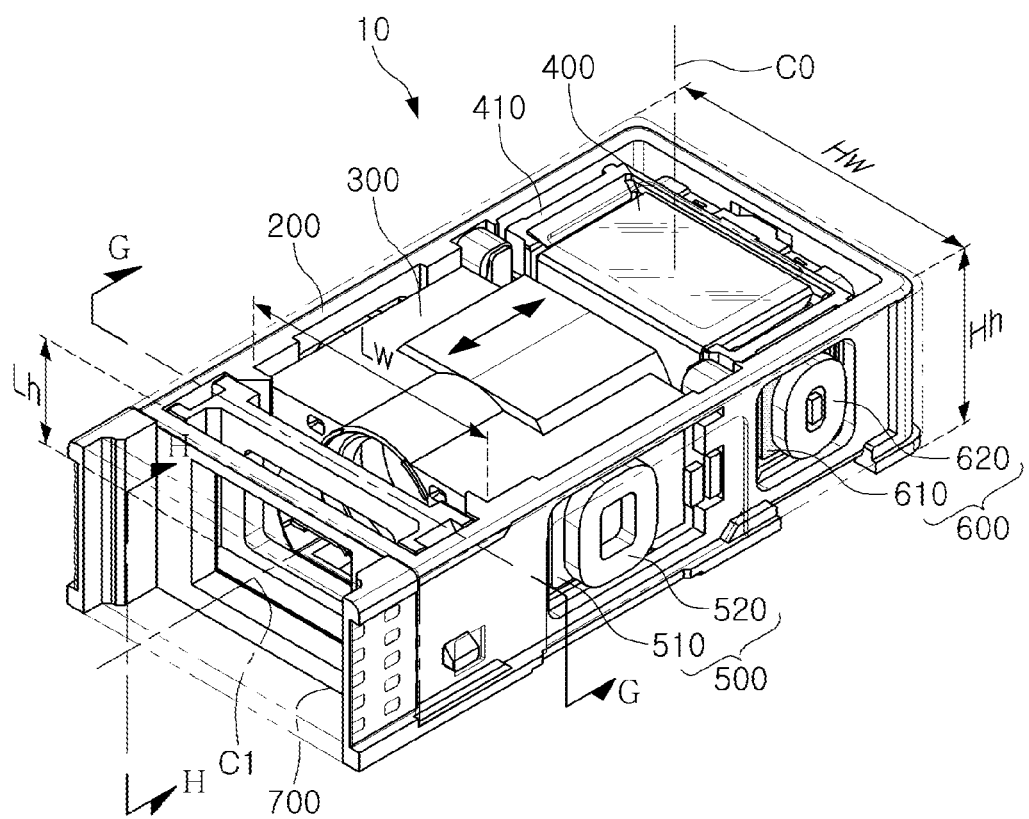
FIG. 11 is a view of one or more examples of a camera module according to an embodiment of the present disclosure.

Next, referring to FIG. 11, one or more examples of a camera module according to an embodiment will be described.

A camera module 10 according to an embodiment includes a housing 200 and a lens barrel 300. Moreover, the camera module 10 may further include a prism 400, driving devices 500 and 600, and an image sensor 700.

The housing 200 may be configured to accommodate main components of the camera module 10. For example, the housing 200 may accommodate one or more of a lens barrel 300, a prism 400, driving devices 500 and 600, and an image sensor 700.

The housing 200 may be formed to be elongated in an optical axis direction. For example, the housing 200 may be formed to have a substantially cuboidal shape.

A portion of the housing 200 may be open. For example, an upper portion of the housing 200 may be open to allow the lens barrel 300 and the prism 400 to be mounted thereon. Moreover, left and right side surfaces of the housing 200 may be partially open to allow the driving devices 500 and 600 to be easily placed. In addition, a rear surface of the housing 200 may be open to allow the image sensor 700 to be placed.

The housing 200 may be formed to allow the camera module 10 to be thinned. For example, a height Hh of the housing 200 may be less than a width Hw of the housing 200.

The lens barrel 300 may be accommodated in the housing 200. The lens barrel 300 may be configured to move in a longitudinal direction of the housing 200. However, a moving direction of the lens barrel 300 is not limited to a longitudinal direction of the housing 200. For example, the lens barrel 200 may move in a width direction of the housing 200 so that the lens barrel may perform hand shaking compensation (Optical Image Stabilization).

The lens barrel 300 may be formed to allow the camera module 10 to be thinned in a similar manner to the housing 200. For example, a height Lh of the lens barrel 300 may be less than a width Lw of the lens barrel 300.

The lens barrel 300 may include one or more lenses. The number of lenses, constituting the lens barrel 300, may vary depending on the type of the camera module 10. For example, the lens barrel 300 according to an embodiment is configured to include four lenses, but may include three or less or five or more lenses, if necessary.

The prism 400 may be accommodated in the housing 200. The prism 400 may be disposed at a considerable distance from the image sensor 700 so as to provide a focal length necessary for telephotography. For example, the prism 400 may be disposed at one end of the housing 200, while the image sensor 700 may be disposed at the other end of the housing 200.

The prism 400 may be configured to convert an optical path. For example, the prism 400 may allow light, incident in an initial portion optical axis C0 direction, to be bent in a subsequent portion optical axis C1 direction. For reference, in an embodiment, the prism 400 is described as a converting device of an optical path, but a reflector or other members may also be used as the converting device of the optical path.

The prism 400 may be configured to perform hand shaking compensation (Optical Image Stabilization). For example, the prism 400 may move in a longitudinal direction or a width direction of the housing 200 to compensate changes in a focus position and the resolution degradation, caused by the hand shaking of the user. Reference numeral 410 denotes a support member for supporting both side surfaces of the prism 400.

A first driving device 500 is configured to drive the lens barrel 300. For example, the first driving device 500 may allow the lens barrel 300 to move in an optical axis C1 direction. The first driving device 500 may allow the lens barrel 300 to move at various displacements. As an example, the first driving device 500 allows the lens barrel 300 to move at a small displacement width for focus adjustment of the camera module 10. As another example, the first driving device 500 allows the lens barrel 300 to move at a large displacement width for variable magnification of the camera module 10.

The first driving device 500 may include components for generating a driving force according to an electrical signal. For example, the first driving device 500 may include a first magnet 510 and a first coil 520. The first magnet 510 is disposed on each of both side surfaces of the lens barrel 300, while the first coil 520 is disposed on each of both side surfaces of the housing 200. However, the arrangement position of the first magnet 510 and the first coil 520 is not limited to that described above. For example, the first magnet 510 may be disposed on the housing 200, and the first coil 520 may be disposed on the lens barrel 300. The first magnet 510 and the first coil 520 may be configured to generate a driving force regardless of movement position of the lens barrel 300. As an example, the first magnet 510 may be formed elongated in a longitudinal direction of the lens barrel 300 or disposed at an interval in a longitudinal direction of the lens barrel 300. As another example, the first coil 520 may be formed to be elongated in a longitudinal direction of the housing 200 or disposed at an interval in a longitudinal direction of the housing 200.

A second driving device 600 may be configured to drive the prism 400. For example, the second driving device 600 may allow the prism 400 to move in a direction intersecting the initial portion optical axis C0.

The second driving device 600 may include components for generating a driving force according to an electrical signal. For example, the second driving device 600 may include a second magnet 610 and a second coil 620. The second magnet 610 is disposed on each of both side surfaces of the prism 400, while the second coil 620 is disposed on each of both side surfaces of the housing 200. However, the arrangement position of the second magnet 610 and the second coil 620 is not limited to that described above. For example, the second magnet 610 may be disposed on the housing 100, and the second coil 620 may be disposed on the prism 300.

The image sensor 700 may be disposed in the housing 200. For example, the image sensor 700 may be disposed at the distal portion of the housing 200. However, the image sensor 700 is not necessarily disposed in the housing 200. For example, the image sensor 700 may be disposed outside the housing 200 to maintain a considerable distance from the prism 400.

The image sensor 700 may be configured to convert an optical signal, incident through the prism 400 and the lens barrel 300, into an electrical signal. For example, the image sensor 700 may be provided as a MOS transistor, CCD, or the like.

Since a height in an optical axis C0 direction is small, the camera module 10, configured as described above, may be easily mounted in a portable terminal requiring thinning.

Figure 12:
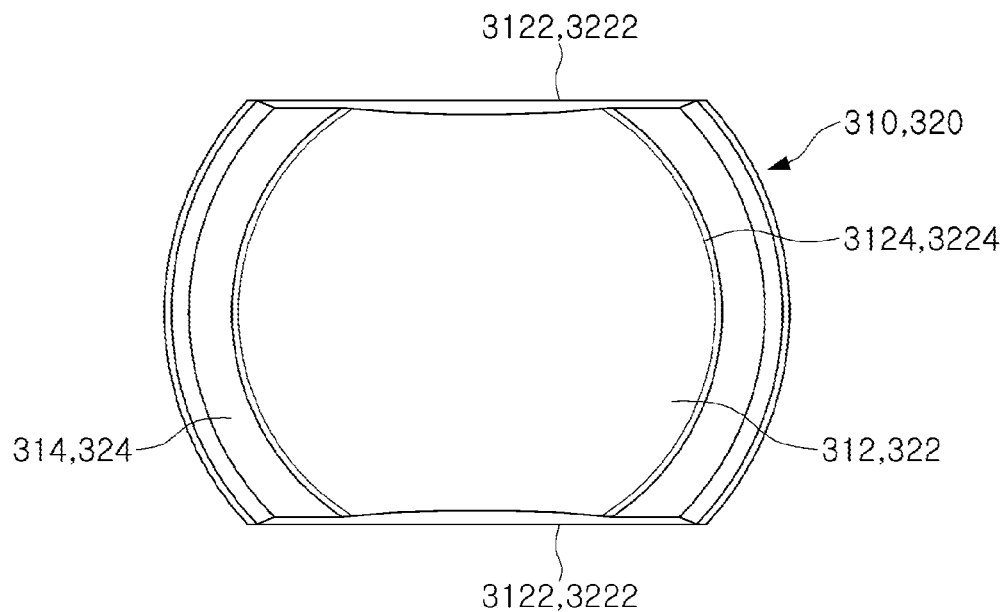
FIG. 12 is a plan view of an example of a lens accommodated in the lens module illustrated in FIG. 11.
Figure 13:
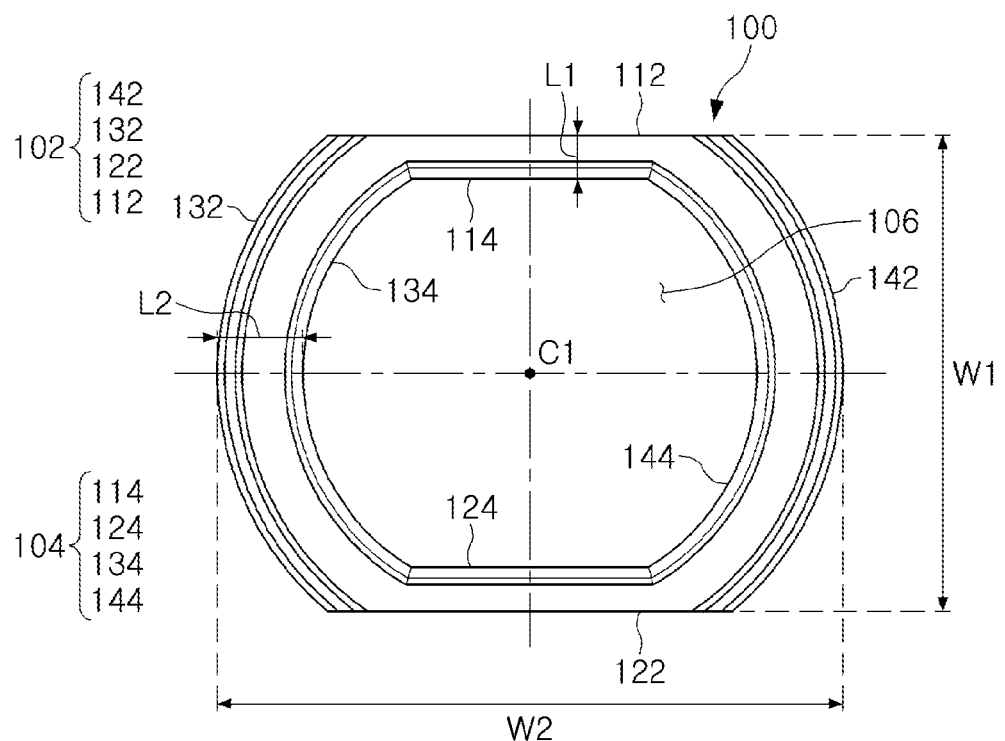
FIG. 13 is a plan view of an example of a spacer accommodated in the lens module illustrated in FIG. 11.

Next, referring to FIGS. 12 and 13, one or more examples of a lens and a spacer, provided in a camera module, will be described.

The camera module 10 may include lenses 310 and 320 as well as a spacer 100, to be easily mounted in the lens barrel 300. The lenses 310 and 320 and the spacer 100 may have a shape elongated in one side direction intersecting an optical axis as illustrated in FIGS. 12 and 13.

The lenses 310 and 320 include refracting portions 312 and 322 and shading portions 314 and 324. The refracting portions 312 and 322 may be configured to allow light, incident in an optical axis, to be bent. For example, the refracting portions 312 and 322 may have a shape in which an object-side surface and/or an image-side surface is concave or convex. The refracting portions 312 and 322 may be formed to have a shape similar to an oblong image sensor 700. For example, the refracting portions 312 and 322 may have a shape elongated toward one side intersecting an optical axis. Moreover, the refracting portions 312 and 322 may include linear portions 3122 and 3222 extended in one side direction (a second direction) intersecting an optical axis. The shading portions 314 and 324 may be formed at intervals from perimeters of the refracting portions 312 and 322. For example, the shading portions 314 and 324 may be formed in curved portions 3124 and 3224 of the refracting portions 312 and 322.

The spacer 100 may have a shape in which a length in a first direction, intersecting an optical axis, is different from a length in a second direction. For example, a transverse section of the spacer 100 may be substantially elliptic or oblong. However, a shape of the transverse section of the spacer 100 is not limited to an ellipse or an oblong.

The spacer 100 may be configured to control an amount of incident light. For example, the inner circumferential surface 104 of the spacer 100 may form a hole 106 for controlling an amount of light. The hole 106 may have a shape substantially similar to a transverse section of the spacer 100. For example, the transverse section of the hole 106 may be substantially elliptic or oblong.

The outer circumferential surface 102 of the spacer 100 includes a plurality of side surface portions. For example, the outer circumferential surface 102 includes a first side surface portion 112, a second side surface portion 122, a third side surface portion 132, and a fourth side surface portion 142.

The first side surface portion 112 and the second side surface portion 122, of the outer circumferential surface 102, may have a linear shape extended in parallel with the second direction. The third side surface portion 132 of the outer circumferential surface 102 may be formed to have a curved shape connecting one end of the first side surface portion 112 to one end of the second side surface portion 122. The fourth side surface portion 142 of the outer circumferential surface 102 may be formed to have a curved shape connecting the other end of the first side surface portion 112 to the other end of the second side surface portion 122.

For reference, in the description, a spacer having a shape illustrated in FIG. 1 is described, but the spacer may be changed into a spacer having a shape illustrated in FIG. 5 or FIG. 8, as required.

Figure 14:
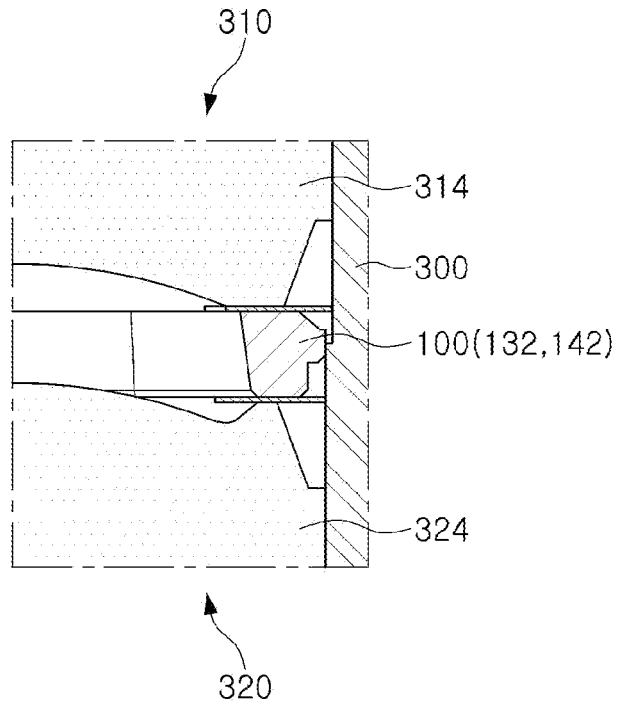
FIG. 14 is a cross-sectional view taken along line G-G of the lens module illustrated in FIG. 11.
Figure 15:
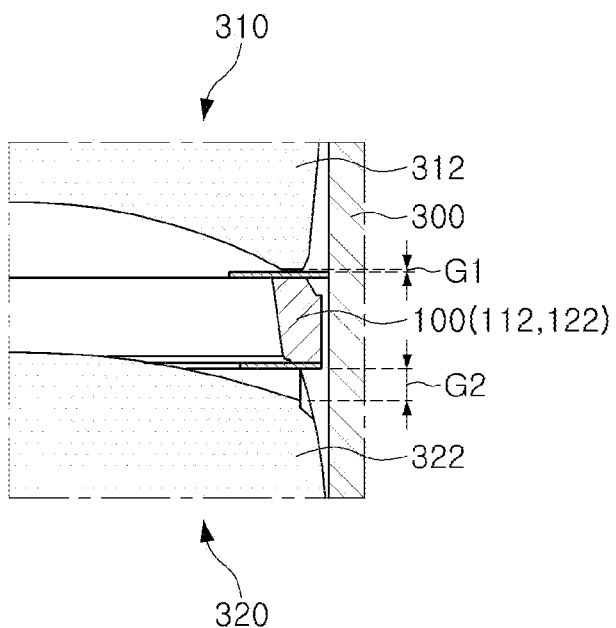
FIG. 15 is a cross-sectional view taken along line H-H of the lens module illustrated in FIG. 11.

Next, referring to FIGS. 14 and 15, one or more examples of structures of a lens and a spacer, mounted on a lens barrel, will be described.

The lens barrel 300 may accommodated one or more lenses. For example, the lens barrel 300 may accommodate a first lens 310 and a second lens 320. The first lens 310 and the second lens 320 may be disposed in an optical axis direction. A spacer 100 may be disposed between the first lens 310 and the second lens 320. The spacer 100 may allow a distance between the first lens 310 and the second lens 320 to be maintained constant. Moreover, the spacer 100 may adjust an amount of light to allow only a portion of light, bent through the first lens 310, to be incident to the second lens 320.

One portion of the spacer 100 may be in contact with the first lens 310 and the second lens 320. For example, in the outer circumferential surface 102 of the spacer 100, the third side surface portion 132 and the fourth side surface portion 142 may be in contact with the shading portion 314 of the first lens 310 and the shading portion 324 of the second lens 320 as illustrated in FIG. 14.

Another portion of the spacer 100 may be disposed at intervals in an optical axis direction from the first lens 310 and the second lens 320. For example, in the outer circumferential surface 102 of the spacer 100, the first side surface portion 112 and the second side surface portion 122 may be disposed at predetermined intervals G1 and G2 from the refracting portion 312 of the first lens 310 and the refracting portion 322 of the second lens 320 (in detail, a linear portion), respectively, as illustrated in FIG. 15.

Since the camera module 10, configured as described above, may be thinned, the camera module may be easily mounted in a small portable terminal.

As set forth above, according to an embodiment of the present disclosure, downsizing and thinning of a camera module may be accomplished.

In addition, a flare phenomenon occurring between a lens and a lens may be reduced.

While specific examples have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A spacer, comprising:
an outer circumferential surface configured to be in contact with a lens barrel; and
an inner circumferential surface forming a hole for controlling an amount of light;
wherein a first length of the hole in a first direction, intersecting an optical axis, and a second length of the hole in a second direction, intersecting the optical axis, are different from each other, and
a first distance from the outer circumferential surface to the inner circumferential surface, extended in the first direction, is less than a second distance from the outer circumferential surface to the inner circumferential surface, extended in the second direction along an entire thickness of the spacer in an optical axis direction.

2. The spacer of claim 1, wherein the outer circumferential surface comprises:
a first side surface portion extended in parallel with the second direction;
a second side surface portion extended in parallel with the first side surface portion;
a third side surface portion connecting one end of the first side surface portion to one end of the second side surface portion and comprising a curved shape; and
a fourth side surface portion connecting the other end of the first side surface portion to the other end of the second side surface portion and comprising a curved shape.

3. The spacer of claim 2, wherein a distance from the first side surface portion to the second side surface portion is equal to or less than 6 mm.

4. The spacer of claim 2, wherein the third side surface portion comprises a linear section extended in parallel with the first direction.

5. The spacer of claim 1, wherein the inner circumferential surface comprises:
a first side surface portion extended in parallel with the second direction;

a second side surface portion extended in parallel with the first side surface portion;

a third side surface portion connecting one end of the first side surface portion to one end of the second side surface portion and comprising a curved shape; and a fourth side surface portion connecting the other end of the first side surface portion to the other end of the second side surface portion and comprising a curved shape.

6. The spacer of claim 5, wherein the third side surface portion and the fourth side surface portion each comprise a first inclination angle with respect to the optical axis, and the first side surface portion and the second side surface portion each comprise a second inclination angle with respect to the optical axis.

7. The spacer of claim 5, wherein the third side surface portion and the fourth side surface portion each comprise a first inclination angle and a second inclination angle with respect to the optical axis, and the first side surface portion and the second side surface portion each comprise a third inclination angle and a fourth inclination angle with respect to the optical axis.

8. The spacer of claim 1, wherein the thickness in the optical axis direction is equal to or greater than 0.15 mm.

9. The spacer of claim 1, wherein the inner circumferential surface comprises an inclination angle with respect to the optical axis.

10. The spacer of claim 9, wherein a minimum area of the hole is equal to or greater than 70% of a maximum area of the hole.

11. A camera module, comprising:

a lens barrel accommodating a first lens and a second lens, disposed in an optical axis direction; and a spacer disposed between the first lens and the second lens, wherein a portion of the spacer is disposed at an interval from one or more of the first lens and the second lens in the optical axis direction, wherein the spacer comprises:

an outer circumferential surface in contact with the lens barrel; and an inner circumferential surface forming a hole through which the optical axis passes, wherein the hole comprises a first length in a first direction, intersecting the optical axis, and a second length in a second direction, intersecting the optical axis, wherein a first distance from the outer circumferential surface to the inner circumferential surface, extended in the first direction, is less than a second distance from the outer circumferential surface to the inner circumferential surface, extended in the second direction along an entire thickness of the spacer in an optical axis direction, and wherein the inner circumferential surface comprises a first side surface portion that extends along the first direction and is inclined with respect to the optical axis and a second side surface portion that extends along the second direction and is inclined with respect to the optical axis.

12. The camera module of claim 11, wherein the outer circumferential surface comprises:

a first side surface portion extended in parallel with the second direction;

a second side surface portion extended in parallel with the first side surface portion;

a third side surface portion connecting one end of the first side surface portion to one end of the second side surface portion and comprising a curved shape; and a fourth side surface portion connecting the other end of the first side surface portion to the other end of the second side surface portion and comprising a curved shape.

13. The camera module of claim 12, wherein the third side surface portion and the fourth side surface portion are disposed in contact with the lens barrel.

14. The camera module of claim 12, wherein one or more of the first lens and the second lens comprises:

a refracting portion configured to refract light incident along the optical axis; and a shading portion disposed at an interval along a perimeter of the refracting portion.

15. The camera module of claim 14, wherein the shading portion is in contact with the third side surface portion and the fourth side surface portion.

16. The camera module of claim 14, wherein the refracting portion comprises a linear portion extended in the second direction.

17. The camera module of claim 16, wherein the linear portion is disposed at intervals from the first side surface portion and the second side surface portion.

* * * * *